United States Patent [19]

Hainsworth

[11] 4,085,997

[45] Apr. 25, 1978

[54] ANODIZE CLAMP

[75] Inventor: William Alfred Hainsworth, Bellevue, Wash.

[73] Assignee: The Boeing Company, Seattle, Wash.

[21] Appl. No.: 782,805

[22] Filed: Mar. 30, 1977

[51] Int. Cl.² ........................................... H01R 11/22
[52] U.S. Cl. .......................... 339/255 P; 204/297 W; 219/140; 269/236; 269/286
[58] Field of Search ................. 339/74 R, 109, 255 P, 339/260, 261; 204/297 R, 297 W; 219/138, 140, 144; 269/44, 98, 236, 254, 286

[56] References Cited
U.S. PATENT DOCUMENTS 3,248,495  4/1966  Kastel ............................... 339/255 P

FOREIGN PATENT DOCUMENTS 1,489,823  6/1966  France ............................ 204/297 R
828,854  2/1960  United Kingdom .............. 339/74 R Primary Examiner—Joseph H. McGlynn
Attorney, Agent, or Firm—Frederick J. McKinnon, Jr.; Lynn H. Hess; Bernard A. Donahue

[57] ABSTRACT

A clamp for electrically connecting a part to be anodized to a conductive bar having a member adapted to attach to the bar and a frame disposed on said member for holding the part to be anodized. Electrical contacts within the frame are forced against the conductive bar and the part to be anodized in the clamped position.

8 Claims, 3 Drawing Figures

ANODIZE CLAMP

BACKGROUND OF THE INVENTION

1. Field of Invention

The present invention relates to a clamp for anodizing or plating applications and particularly to a clamp assembly for electrically connecting a part to be anodized to a conductive bar, which clamp is constructed of materials resistant to destruction by the chemical solutions utilized in the plating or anodizing processes.

2. Description of the Prior Art

In plating articles, especially in large quantities, clamps utilized to secure the article to be plated to a conductor bar must be designed to permit quick insertion and removal of the article. After a relatively short period of use, typically less than a year, clamp spring members become bent or broken making the mounting of articles more difficult and time consuming. Additionally, due to the inherent destructive nature of the acid plating solution, these clamps required use of expensive age hardened titanium alloy springs which required welding to the clamp body. The present invention avoids these problems by minimizing the use of titanium, and where such use is necessary, restricting it to low stress levels where less expensive commercially pure titanium is satisfactory. The frame of the clamp is constructed from a high density polypropylene which resists destruction when exposed to the chemical solutions used in the plating process.

SUMMARY OF THE INVENTION

The primary object of the present invention is to provide a clamp assembly which electrically connects a conductor bar to a part to be anodized which possesses long life when repeatedly exposed to the chemical solutions used in acid anodizing or plating processes.

In accordance with the present invention, an apparatus for electrically connecting a part to be anodized to a conductor bar in an anodizing process is provided by a member adapted to attach to the conductor bar having a frame for holding the part disposed on the member, means for floating an electrical conductor within the frame between the conductor bar and the part to be anodized, and means for securing electrical contact between the conductor bar and the part to be anodized.

In further accord with the present invention, the clamp which secures the part to be plated to the conductor bar is constructed from an acid resistant high density polypropylene plastic.

The foregoing and other objects, features and advantages of the present invention will become more apparent in the light of the detailed description of a preferred embodiment thereof, as is illustrated in the accompanying drawings.

DESCRIPTIONS OF THE DRAWINGS

DESCRIPTION OF THE PREFERRED EMBODIMENT

Figure 1:
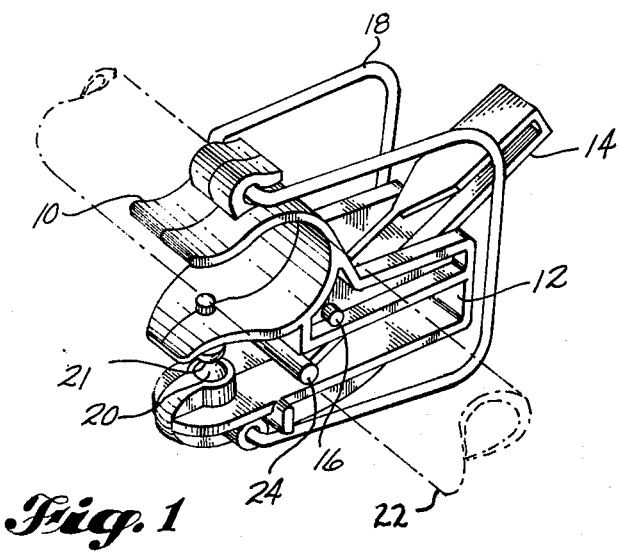
FIG. 1 is perspective view of the clamp according to an embodiment of the present invention.

Referring now to FIG. 1, the anodize clamp comprises a member 10, a frame 12 which is an integral portion of member 10, a lever 14 pivotally secured within frame 12 by a pin 16, a spring 18, and a plurality of electrical contacts 20 and 21.

Figure 3:
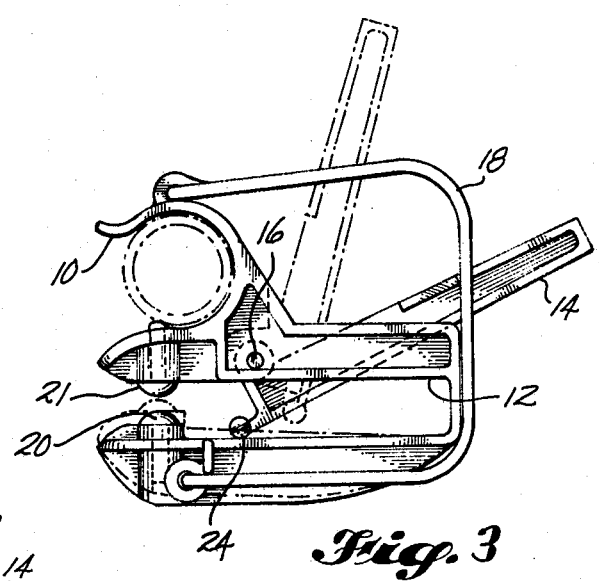
FIG. 3 is a side elevation view of the clamp.
Figure 2:
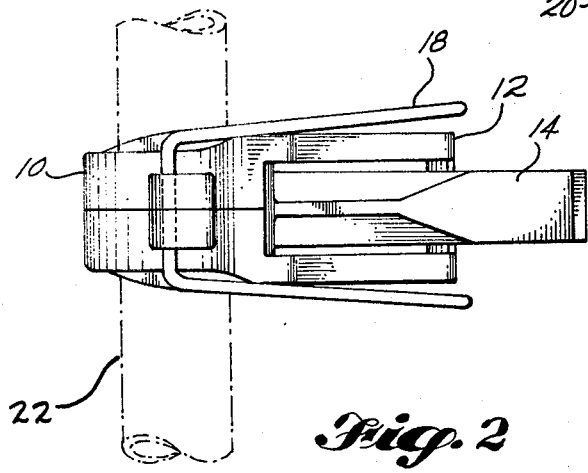
FIG. 2 is a top view of the clamp.

In the preferred embodiment, as shown in FIG. 3, the member 10 is an integral portion of the frame 12. The opening within the member 10 is slightly smaller than the outside diameter of a conductor bar 22 such that when the clamp snaps on the conductor bar 22, a snug fit between the conductor bar 22 and the member 10 is observed. Both the member 10 and the frame 12 are constructed from a high density polypropylene plastic which has a demonstrated long life when repeatedly exposed to typical chemical solutions used in the phosphoric acid anodizing process.

Pivotally secured by a pin 16 within the frame 12 of the clamp is a lever 14 containing a cam surface 24 at one end. As shown by the solid lines in FIG. 3, the lever 14 and its cam surface 24 force the frame 10 and the electrical contacts 20 and 21 to the open position. In this manner, the part to be plated may be easily inserted between the contacts 20 and 21 and the lever 14 moved to the closed position (see the dotted lines in FIG. 3). When this occurs, the normal resilient property of the polypropylene plastic and the spring 18 (as will be described) force the electrical contacts 20 and 21 to firmly grasp the part to be anodized thereby insuring electrical contact.

The lever 14 is constructed from the same high density polypropylene plastic as is the frame 10. The pin 16 is made from commercially pure titanium.

A "U" shaped spring 18, extending the length of the clamp, connects the top surface of the member 10 to the frame 12. The geometry of the spring 18 is such that the distance measured across the open end of the "U" shape is slightly smaller than the distance measured across the combination of the member 10 and the frame 12. In this manner, and with the lever 14 in the closed position, the spring 18 naturally forces the electrical contacts 20 and 21 together. The spring 18 is adaptable to easily snap on the top surface of the member 10 and the frame 12. As in the case of the pin 16, the spring 18 is constructed from commercially pure titanium.

A plurality of electrical contacts 20 and 21 are contained within the frame 12. Electrical contact 20 is rigidly secured in the frame 12, while electrical contact 21 is slidably mounted in the frame 12. In this manner, when a part to be plated is inserted between the electrical contacts 20 and 21, and the lever 14 is in the closed position, a portion of electrical contact 21 extends through the frame 12 to contact the conductor bar 22. As shown in the preferred embodiment, electrical contacts 20 and 21 are simple rivets. Each contact is constructed from Columbium titanium.

In operation, the clamp easily snaps on a conductor bar 22 through the opening within the member 10. The part to be anodized is placed between the electrical contacts 20 and 21, and the lever 14 is moved to the closed position. Electrical contacts 20 and 21 firmly grasp the part to be anodized, with a portion of the contact 21 sliding through the frame 12 to contact the conductor bar. The combination of clamp and part to be anodized is then immersed in a chemical solution, and anodizing current is directed by the electrical contacts 20 and 21 through the part to be anodized to the conductor bar 22.

There has thus been described a preferred embodiment of an anodize clamp in accordance with the present invention. It will be obvious to anyone skilled in the art that the teachings of this invention may be used to advantage in any situation where it is necessary to provide an anodize clamp for repeated use in chemical solutions. Therefore it should be understood by those skilled in the art that various changes and omissions in the form and detail thereof may be made therein without departing from the spirit and scope of the invention, which is to be limited only as set forth in the following claims.

What is claimed is:

1. An apparatus for electrically connecting a part to be anodized to a conductor bar in an anodizing process which comprises:
   a member adapted to attach to said conductor bar;
   a frame disposed on said member for holding said part to be anodized;
   means for slidably mounting an electrical conductor within said frame between said conductor bar and said part to be anodized; and
   means for forcing said part to be anodized against the slidably mounted conductor for securing electrical contact between said conductor bar and said part to be anodized.

2. The apparatus of claim 1 wherein said frame is an integral portion of said member.

3. The apparatus of claim 1 wherein said means for slidably mounting an electrical conductor within said frame comprises an aperture within said frame, and wherein said electrical conductor comprises a first rivet slidably disposed in said frame aperture and adapted to contact said conductor bar and said part to be anodized.

4. The apparatus of claim 3 wherein said rivets are made from columbium titanium.

5. The apparatus of claim 1 wherein said means for forcing said part to be anodized against said electrical conductor comprises:
   a spring having an open end and a closed end, said open end detachably secured to said member and said frame, said open end being smaller than the height of said member and said frame thereby urging said electrical conductors together.

6. The apparatus of claim 5 wherein said spring is constructed from commercially pure titanium.

7. The apparatus of claim 5 wherein a second rivet is secured to said frame generally opposite said first rivet and wherein a lever is pivotally disposed within said frame, said lever having a cam at one end, said cam adapted to separate the first and second rivets within said frame.

8. The apparatus of claim 7 wherein said frame, said member and said lever are constructed from high density polypropylene plastic.

* * * * *